Feb. 27, 1968  M. L. BENJAMIN ET AL  3,370,859
CHUCK
Filed July 16, 1965  2 Sheets-Sheet 1
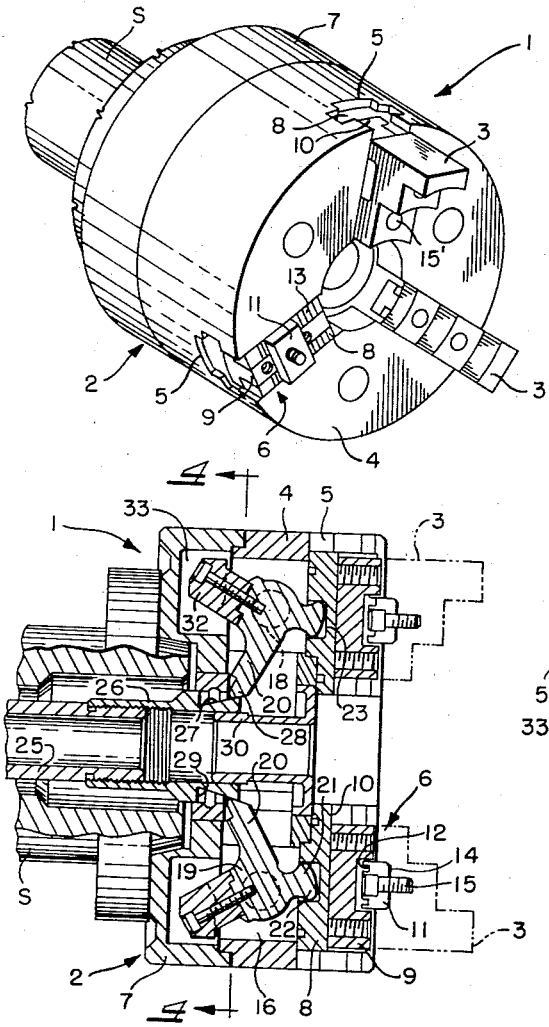
Fig. 1
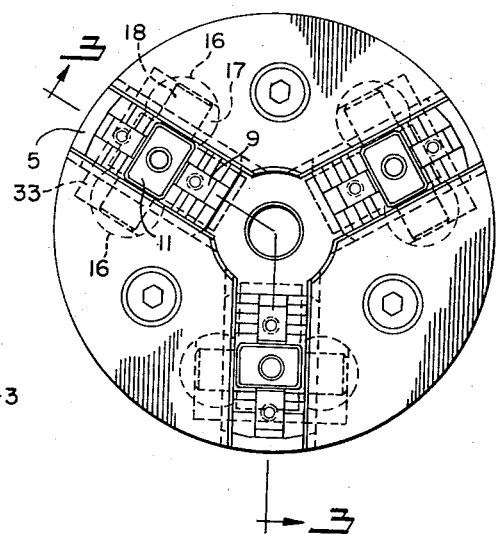
Fig. 2
Fig. 3
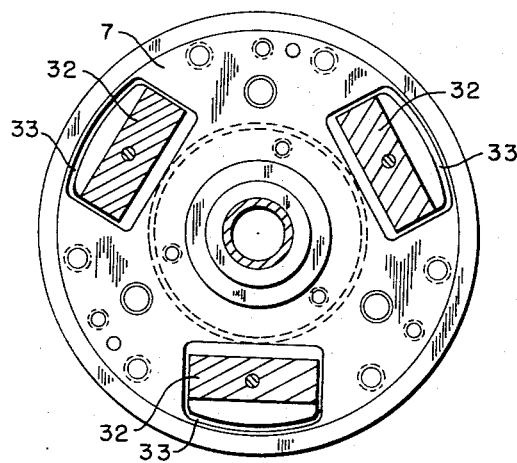
Fig. 4
INVENTORS.
MILTON L. BENJAMIN
DAVID D. WALKER
BY
Oberlin, Maky & Donnelly
ATTORNEYS Feb. 27, 1968  M. L. BENJAMIN ET AL  3,370,859
CHUCK
Filed July 16, 1965  2 Sheets-Sheet 2

INVENTORS.
MILTON L. BENJAMIN
DAVID D. WALKER
BY
Oberlin, Maky & Donnelly
ATTORNEYS

United States Patent Office 3,370,859
Patented Feb. 27, 1968

3,370,859
CHUCK
Milton L. Benjamin and David D. Walker, Chagrin Falls, Ohio, assignors to Erickson Tool Company, Solon, Ohio, a corporation of Ohio
Filed July 16, 1965, Ser. No. 472,448
2 Claims. (Cl. 279—119)

ABSTRACT OF THE DISCLOSURE

A chuck having lever means which when rotated cause radial movement of the chuck jaws into and out of workpiece gripping position. Counterweights attached to the lever means counteract the centrifugal force acting on the jaws during rotation of the chuck tending to reduce the gripping action thereof, whereby a substantially uniform grip is maintained on a workpiece regardless of the speed of rotation of the chuck.

---

This invention relates generally, as indicated, to a chuck and, more particularly, to a fluid operated chuck of novel construction which is especially adapted to maintain a substantially uniform grip on a workpiece even when the chuck is rotated at relatively high speeds.

In fluid operated chucks of the usual construction, there is generally provided a fluid operated slide member which actuates a plurality of levers associated with the chuck jaws for radially moving the jaws into and out of engagement with a workpiece located centrally of the jaws. Through such an arrangement, a satisfactory gripping force can be exerted rather quickly, and can be released just as quickly. However, if the chuck is caused to rotate at relatively high speeds, the centrifugal force acting on the radially movable chuck jaws tends to move the jaws radially outwardly, thereby reducing the effective gripping force. Of course, the faster the rotational speed of the chuck, the greater the centrifugal force tending to overcome the gripping force. In actual practice, it has been found that if the usual chuck of this type is rotated in the order of 5,000 r.p.m., the grip will be lost almost entirely.

It is therefore a principal object of this invention to provide a novel fluid operated chuck which is capable of maintaining a substantially uniform grip on a workpiece from zero rotational speed of the chuck up to relatively high rotational speeds.

Another object is to provide such a chuck with pivotally mounted jaw operating levers, and counterweights on the levers for counteracting the centrifugal force acting on the jaws tending to move them radially outwardly.

A further object is to provide a chuck of the type described in which the counterweights are mounted on the jaw operating levers on the side of the lever pivots directly opposite the jaws.

Still another object is to mount such counterweights in slides in the body of the chuck for direct radial movement, and to provide a lost motion connection between the jaw operating levers and the counterweights with the counterweights in substantially axial alignment with the jaws but on opposite sides of the lever pivots.

Another object is to provide pockets or slides in the chuck body to permit movement of the counterweights therein.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principle of the invention may be employed.

In said annexed drawing:

FIG. 1 is an isometric view of the preferred form of chuck constructed in accordance with the present invention with one of the chuck jaws being omitted for purposes of clarity;

FIG. 2 is an elevation view of the jaw end of the chuck, but with the jaws removed;

FIG. 3 is a substantially vertical section taken on the plane of the line 3—3 of FIG. 2 showing the chuck in the closed position;

FIG. 4 is a vertical section taken on the plane of the line 4—4 of FIG. 3 showing the front face of the back plate of the chuck with the counterweight receiving pockets therein;

Figure 5:
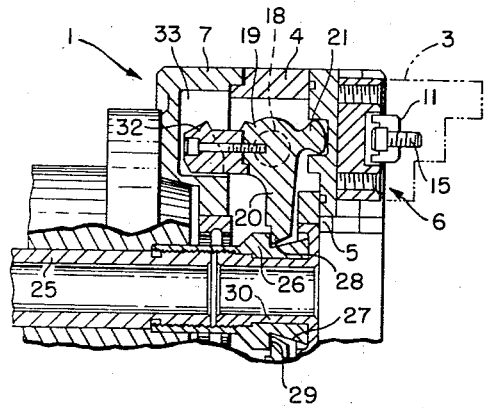
FIG. 5 is a fragmentary section of the chuck of FIG. 3, but showing the chuck in the open position.

Turning now to the drawing, and first of all to FIG. 1, a preferred form of chuck in accordance with the present invention is generally indicated at 1 and includes a body 2 having a plurality of jaws 3 mounted thereon for radial movement toward and away from each other. The body 2 is shown mounted on a spindle S for rotational movement therewith when attached to the arbor of a machine tool, not shown, in any conventional manner. As perhaps best seen in FIG. 3, the body 2 consists of two main parts, a front plate 4 having a plurality of circumferentially spaced radial T-slots 5 therein for receipt of the jaw mountings 6, and a back plate 7 secured to the front plate 4 by suitable fasteners.

Each of the jaw mountings 6 comprises a jaw base 8 disposed in a radial T-slot 5 for radial movement, a jaw clamp nut 9 slidably received in a T-slot 10 in the jaw base 8, and a cross tongue or key 11 projecting axially outwardly from the jaw clamp nut 9 and having serrations 12 which engage like serrations 13 on the jaw base 8. The key 11 is adapted to be received in a recess 14 in the jaw 3 and has a screw 15 extending therethrough for locking the jaw to the key. Also, similar screws 15' or the like (see FIG. 1) are used to securely fasten the jaw 3 to the jaw clamp nut 9.

Directly behind the radial slots 5 in the front plate 4 there are provided pairs of cylindrical openings 16 in which they are disposed trunnion blocks 17 for mounting the trunnions 18 of jaw operating levers 19. The levers 19 each include a pair of arms 20 and 21, the arm 20 extending in a generally radially inward direction, and the arm 21 extending in a generally axially outward direction. As clearly shown in FIG. 3, the outer end 22 of the axial arm 21 is received in a recess 23 in the adjacent jaw base 8. Accordingly, pivoting of the arms 21 inwardly about their respective trunnions 18 will cause radial inward movement of the jaws 3 through the lost motion connection between the axial arms 21 and the jaw bases 8. Conversely, pivoting of the arms 21 outwardly causes radial outward movement of the jaws 3.

Such pivotal movement of the levers 19 is effected through axial movement of the draw sleeve 25 and slider 26 threadedly mounted thereon through actuation of a suitable fluid motor, as is well known in the art. As evident, axial movement of the draw sleeve 25 toward the left as viewed in FIG. 3 causes the wedge surface 27 on the slider 26 to engage the free end 28 of the arms 20 and force the same rearwardly, thereby causing inward pivotal movement of the axial arms 21 about the trunnions 18 and radial inward movement of the jaws 3. Movement of the draw sleeve 25 in the opposite direction causes the shoulder 29 on the slider 26 to engage the arms 20 and move the same toward the right, thereby rotating the axial arms 21 outwardly and moving the jaws 3 radially outward, as shown in FIG. 5. A sleeve 30 mounted centrally within the chuck 1 provides a suitable guide surface for guiding the movement of the slider 26.

The fluid actuated chuck 1 as thus far described will readily grip a workpiece disposed between the jaws 3 thereof in a very rapid manner, it only being necessary to actuate a fluid motor to cause axial movement of the draw sleeve 25. However, if the chuck 1 is then rotated, the centrifugal force acting on the jaws 3 and their mountings 6 tends to move them radially outwardly and thus substantially reduces the effectiveness of the gripping force exerted on a workpiece, so much so in fact that if the rotational speed of the chuck 1 is increased to say about 5,000 r.p.m., the gripping force is entirely lost.

To eliminate or at least substantially reduce this loss in the gripping force as the rotational speed of the chuck 1 is increased, counterweights 32 are mounted on the jaw operating levers 19, preferably in direct axial alignment with the arms 21, but on the opposite side of the trunnions 18 whereat the centrifugal force acting on the counterweights 32 tends to move the arms 21 inwardly in opposition to the centrifugal force acting on the jaws 3 and mountings 6. As clearly shown in FIGS. 3–5, pockets or recesses 33 are provided in the back plate 7 of the chuck body 2 to receive the counterweights 32 and provide sufficient clearance for their pivotal movements in both the inward and outward directions.

As evident, the amount of centrifugal force acting on the counterweights 32 tending to counteract the centrifugal force acting on the jaws 3 and jaw mountings 6 depends on the weight of the counterweights 32 and the distance between the axis of the trunnions 18 about which the counterweights pivot and the center of gravity of the counterweights. Preferably, a metal alloy approximately three times heavier than steel having a high tungsten content is used for the counterweights, thereby permitting a smaller sized counterweight to be used and also permitting the counterweight to be located closer to the axis of the trunnions 18 and still effect the desired counteracting force.

Figure 7:
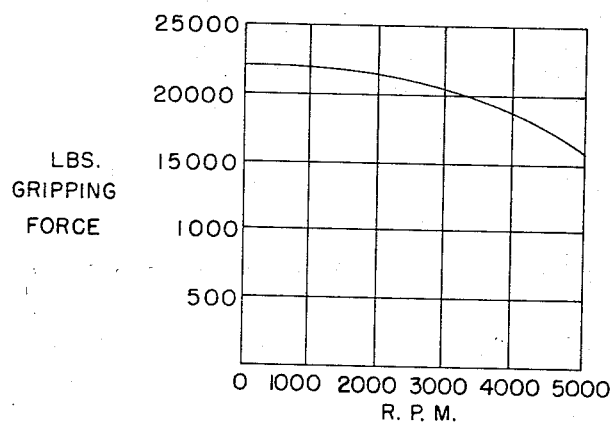
FIG. 7 is a graph illustrating the gripping force exerted by the chuck of the present invention at various rotational speeds of the chuck.

As shown in FIG. 7, a chuck 1 provided with counterweights 32 as described above will maintain a substantially uniform grip on a workpiece up to 5,000 r.p.m., the actual loss in gripping force being only about 25 percent. Of course, the loss in gripping force could be even further reduced by increasing the mass of the counterweights, or by increasing the distance between the center of gravity of the counterweights and the axis of the trunnions 18, or both. As a matter of fact, the gripping force could even be increased with increased rotational speed, if the mass of the counterweights were greater than that of the jaws 3 and jaw mountings 6.

Figure 6:
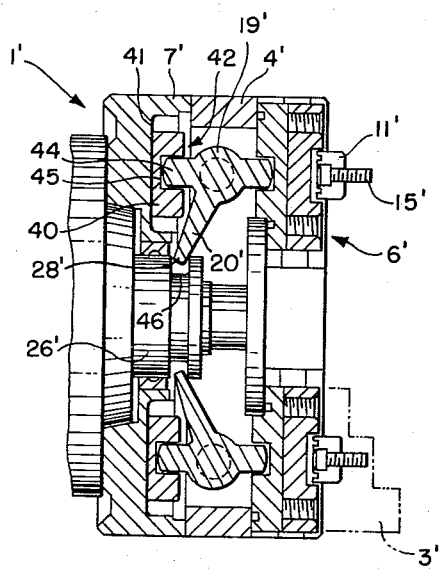
FIG. 6 is a vertical section of another form of chuck in accordance with the present invention.

While in the preferred form of chuck 1 the counterweights 32 are attached directly to the jaw operating levers 19 for pivotal movement therewith, the counterweights may also be mounted for radial movement, as are the mountings 6 and jaws 3. Such a construction is shown in FIG. 6, wherein the counterweights 40 of the chuck 1' are disposed in radial slots 41 in the back plate 7' for radial sliding movement, and there is a lost motion connection 42 between the jaw operating levers 19' and the counterweights 40 preferably comprising an additional arm 44 extending from the levers 19' radially inwardly into a recess 45 in the counterweights. The structure and operation of the modified form of chuck 1' shown in FIG. 6 is otherwise identical to the chuck 1 previously described, except that the free end 28' of the radial arm 20' is disposed in a groove 46 in the slide 26', rather than engaged by a wedge surface 27 and a shoulder 29, as in the FIG. 1 embodiment. Accordingly, the same reference numerals followed by a prime symbol are used to designate like parts. Also, since the operation of the chuck 1' is substantially the same as the operation of the chuck 1, no further discussion of the same is thought to be necessary.

From the foregoing, it should now readily be apparent that the chucks 1 or 1' of the present invention are quite unique in that they are capable of exerting substantially the same amount of gripping force on a workpiece clamped thereby, whether the chucks are standing still or rotating at high speeds of up to say 5,000 r.p.m. and even more. This unique result is accomplished by providing counterweights associated with the jaw operating levers in such a manner that the centrifugal force acting on the counterweights during rotation of the chucks counteracts the centrifugal force acting on the jaws and their mountings. Accordingly, the effective centrifugal force tending to overcome the grip exerted on the workpiece by the jaws is substantially reduced, and can even be eliminated.

Other modes of applying the principles of the invention may be employed, change being made as regards the details described, provided the features stated in any of the following claims or the equivalent of such be employed.

We, therefore, particularly point out and distinctly claim as our invention:

1. A chuck comprising a chuck body, a jaw supported by said chuck body for radial movement into and out of workpiece gripping position, lever means pivotally mounted on said chuck body with its pivotal axis extending transversely of the axis of said chuck body, said lever means having a first arm extending radially outwardly therefrom and operatively connected to said jaw for effecting such radial movement when pivoted in opposite directions, means for pivoting said lever means, and means for substantially completely counteracting the centrifugal force acting on said jaw during rotation of said chuck tending to reduce the gripping action thereof, whereby a substantially uniform grip is maintained on a workpiece regardless of the speed of rotation of said chuck, said last-mentioned means comprising a counterweight, and means mounting said counterweight directly to said lever means for pivotal movement therewith on the side of the lever pivot opposite said first arm, said chuck body comprising a pair of plates releasably secured together, one of said plates having an opening therein in which said lever means is pivotally mounted, and the other of said plates having a recess in axial alignment with said opening in said one plate for receipt of said counterweight, said recess providing sufficient clearance for said counterweight during such pivotal movement of said lever means, said counterweight being of a metal alloy having sufficient tungsten content that it is approximately three times heavier than steel.

2. The chuck of claim 1 wherein there are a plurality of jaws supported by said chuck body for radial movement into and out of workpiece gripping position, a plurality of lever means for effecting such radial movement of said jaws, and a plurality of counterweights operatively connected to said jaws as aforesaid to substantially completely counteract the centrifugal force acting on said jaws during rotation of said chuck tending to reduce their gripping action.

References Cited

UNITED STATES PATENTS 2,729,459    1/1956    Leifer _____ 279—119
2,784,977    3/1957    Dinsmore _____ 279—1

ROBERT C. RIORDON, *Primary Examiner.*